US012166876B2

(12) United States Patent
Liu

(10) Patent No.: US 12,166,876 B2
(45) Date of Patent: Dec. 10, 2024

(54) EMBEDDED HARDWARE SECURITY MODULE (HSM)

(71) Applicant: Micron Technology, Inc., Boise, ID (US)

(72) Inventor: Zhan Liu, Cupertino, CA (US)

(73) Assignee: Micron Technology, Inc., Boise, ID (US)

(*) Notice: Subject to any disclaimer, the term of this patent is extended or adjusted under 35 U.S.C. 154(b) by 235 days.

(21) Appl. No.: 17/390,049

(22) Filed: Jul. 30, 2021

(65) Prior Publication Data

US 2023/0033630 A1 Feb. 2, 2023

(51) Int. Cl.
*H04L 9/08* (2006.01)
*H04L 9/32* (2006.01)

(52) U.S. Cl.
CPC .......... *H04L 9/0897* (2013.01); *H04L 9/0825* (2013.01); *H04L 9/0869* (2013.01); *H04L 9/3247* (2013.01); *H04L 9/3278* (2013.01)

(58) Field of Classification Search
CPC ... H04L 9/0897; H04L 9/0825; H04L 9/0869; H04L 9/3247; H04L 9/3278; H04L 9/0662; H04L 9/0866
See application file for complete search history.

(56) References Cited

U.S. PATENT DOCUMENTS

2013/0051552 A1* 2/2013 Handschuh ........... H04L 9/0897
380/44
2015/0234751 A1* 8/2015 Van Der Sluis .... G06F 12/1408
713/193

* cited by examiner

*Primary Examiner* — Izunna Okeke
(74) *Attorney, Agent, or Firm* — Greenberg Traurig

(57) ABSTRACT

The disclosed embodiments relate to hardware security modules. In one embodiment, a method is disclosed comprising reading a random value from a physically unclonable function (PUF); generating a seed value from the random value; generating a cryptographic key using the seed value; and processing a cryptographic operation using the cryptographic key.

19 Claims, 6 Drawing Sheets

EMBEDDED HARDWARE SECURITY MODULE (HSM)

TECHNICAL FIELD

At least some embodiments disclosed herein relate to memory devices in general, and more particularly, but not limited to providing an embedded hardware security module (HSM) in a memory device.

BACKGROUND

A memory subsystem can include one or more memory devices that store data. The memory devices can be, for example, non-volatile memory devices and volatile storage area devices. A host system can utilize a memory subsystem to store data at the memory devices and retrieve data from the memory devices.

BRIEF DESCRIPTION OF THE DRAWINGS

The embodiments are illustrated by way of example and not limitation in the figures of the accompanying drawings in which identical references indicate similar elements.

DETAILED DESCRIPTION

In an embodiment, an HSM comprises a dedicated computing device (e.g., processor, system-on-a-chip). In an embodiment, the HSM can include an interface (e.g., Peripheral Component Interconnect Express) to connect to an external device such as a host processor. In an embodiment, the HSM can further include a crypto-processor, or similar core, for performing cryptographic operations (e.g., cryptographic key generation, digital signature generation, encryption/decryption, etc.). In an embodiment, the HSM can further include a volatile storage area (e.g., dynamic random-access memory). In an embodiment, the HSM does not include a non-volatile storage medium for the storage of keys or other data. In an embodiment, the HSM can include a physically unclonable function (PUF) that can generate a random number. In some embodiments, the HSM uses this random number as a master secret. In an embodiment, the master secret can be used to generate cryptographic keys using various, non-limiting key generation algorithms. In an embodiment, the HSM can store these keys in a volatile storage area and provide the keys (or operations using the keys) to an external device via the interface.

In one embodiment, when the HSM is powered on, it generates a unique value using a PUF. The HSM stores this unique value (referred to as a seed) in a volatile storage area location for future use. In one embodiment, the HSM creates a PUF from one kilobyte of uninitialized controller static random-access memory (SRAM) that is not subsequently used for any other purpose. Thus, the PUF key is related to the random value of the one kilobyte of SRAM, which has very high entropy.

In an embodiment, after the seed is generated and stored in steps through, the HSM may receive a request to generate a new key. The new key may comprise a symmetric key or an asymmetric key pair. In either scenario, the HSM loads the seed and generates a new key corresponding to the request. In an embodiment, the HSM stores this key and indexes the key for later use. In one embodiment, this PUF value replaces a random number generator (RNG) or pseudo-random number generator (PRNG) value for seed generation and, thus, key generation.

In an embodiment, the HSM can receive a subsequent request to encrypt data, decrypt data, or perform some other operation on data that requires a cryptographic key. The HSM loads the key and performs the operation, returning the result. Late, the HSM may be powered off. Since the keys are stored in a volatile storage area, all keys (and the seed value) are immediately erased by the nature of being stored in a volatile storage area.

By not storing keys, the HSM is not susceptible to offline (i.e., lab) attacks. Further, the security requirements can be relaxed since keys are only stored in a volatile storage area and not persistent memory. A lack of non-volatile memory can also reduce the cost of the device.

Figure 1:
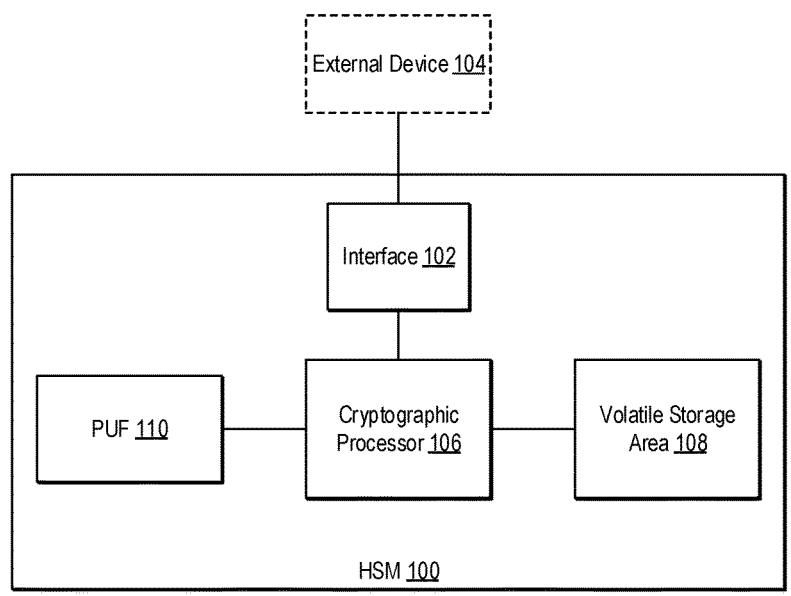
FIG. 1 is a block diagram of an embedded HSM according to some embodiments.

FIG. 1 is a block diagram of an embedded HSM according to some embodiments.

In the illustrated embodiment, an HSM 100 is communicatively coupled to an external device 104. The HSM 100 receives data from the external device 104 via an interface 102. The interface 102 processes and forwards data to crypto-processor 106. The crypto-processor 106 communicates with PUF 110 and volatile storage area 108 to process secure commands. Further details on the operation of HSM 100 are provided herein.

In an embodiment, the external device 104 can comprise any device capable of communicating via a datapath. For example, external device 104 can comprise a general-purpose microprocessor, a system-on-a-chip (SoC), controller, application-specific integrated circuit (ASIC), field-programmable gate array (FGPA), or other similar circuit or device. In some embodiments, external device 104 can comprise a computing device such as a laptop, desktop, server, or similar larger-scale computing device.

In an embodiment, HSM 100 can also comprise a computing device capable of communicating via a datapath. For example, HSM 100 can comprise a general-purpose microprocessor, a system-on-a-chip (SoC), controller, ASIC, FGPA, or other similar circuit or device. In some embodiments, external device 104 can comprise a computing device such as a laptop, desktop, server, or similar larger-scale computing device. In one embodiment, HSM 100 can be implemented in another computing device. For example, HSM 100 can be embedded within a memory device such as a Flash storage device or a similar storage device. In one embodiment, some or all of the functions of crypto-processor 106 (discussed herein) can be implemented in an existing processor of a computing device such as the controller of a memory device.

In an embodiment, HSM 100 includes an interface 102 that facilitates communications to and from external device 104. In one embodiment, interface 102 can comprise a Peripheral Component Interconnect Express (PCIe) interface. The interface 102 can comprise other similar types of interfaces such as a Non-Volatile Memory Express (NVMe), NVMe over Fiber (NVMeOF), Serial Peripheral Interface (SPI), or similar bus. In an embodiment, HSM 100 receives commands from external device 104 via interface 102. In an embodiment, these commands can comprise commands to be executed in a secure manner. For example, the commands can comprise commands to generate cryptographic keys, read cryptographic keys, encrypt or decrypt data, generate digital signatures, etc. The specific details of individual commands are not described in length herein. Indeed, any commands currently executable by existing HSMs can be received via interface 102. Thus, in some embodiments, the HSM 100 can replace existing HSM devices without a change in interface connectivity.

A crypto-processor 106 receives commands from interface 102. In an embodiment, crypto-processor 106 can execute firmware or similar code in response to commands received over the interface 102. The crypto-processor 106 can execute commands to generate a seed value, as described in the description of FIG. 2. The crypto-processor 106 can execute commands to generate cryptographic keys, as described in the description of FIG. 3. The crypto-processor 106 can execute commands to perform cryptographic operations, as described in the description of FIG. 4. The details of these figures are not repeated for the sake of clarity, and reference is made to those figures for further detail on the operations of crypto-processor 106.

In an embodiment, HSM 100 includes a volatile storage area 108. In an embodiment, volatile storage area 108 can comprise any type of memory that loses its data when powered off. For example, volatile storage area 108 can comprise a dynamic random-access memory (DRAM), static random-access memory (SRAM), or similar types of volatile storage area technologies. As described further herein, HSM 100 uses the volatile storage area 108 to store cryptographic data (e.g., keys, seeds, results, etc.). Since the volatile storage area 108 loses data when powered off, the HSM 100 never persistently stores sensitive data when powered off. As will be explained, in some embodiments, volatile storage area 108 can comprise a register file or may comprise a DRAM or SRAM and one or more registers.

In an embodiment, HSM 100 includes a PUF 110. In the illustrated embodiment, the PUF 110 may comprise a physical hardware circuit that exploits inherent randomness introduced during manufacturing to give a physical entity a unique 'fingerprint' or trust anchor. In the illustrated embodiment, the PUF 110 produces a consistent and repeatable value. In some embodiments, the PUF 110 may comprise an SRAM PUF, Delay PUF, or any other PUF technology implemented on the HSM 100. In one embodiment, the HSM 100 creates a PUF 110 from one kilobyte of uninitialized memory space in volatile storage area 108 that is not subsequently used for any other purpose. Thus, the PUF 110 value is related to the random value of the one kilobyte of the memory space in volatile storage area 108, which has very high entropy.

By not storing keys, the HSM 100 is not susceptible to offline (i.e., lab) attacks. Further, the security requirements can be relaxed since keys are only stored in volatile storage area 108 and not persistent memory. A lack of non-volatile memory can also reduce the cost of the HSM 100 or any device implementing the HSM 100.

Figure 2:
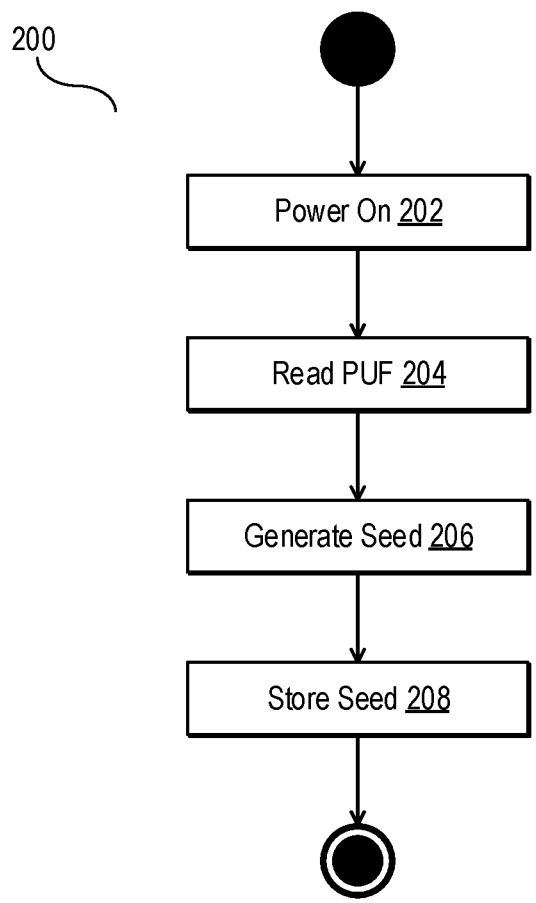
FIG. 2 is a flow diagram illustrating a method for generating a seed value in an HSM according to some embodiments.

FIG. 2 is a flow diagram illustrating a method for generating a seed value in an HSM according to some embodiments. In an embodiment, a crypto-processor of an HSM can execute method 200. In an embodiment, a processor of a memory device can execute method 200. However, the disclosure does not limit the type of process that can execute method 200.

In block 202, method 200 can comprise powering on. In an embodiment, method 200 can be powered on at any moment. In some embodiments, method 200 can power on in response to an external device. In other embodiments, method 200 can independently power on.

In block 204, method 200 can comprise reading a PUF value.

In one embodiment, a PUF value comprises a repeatable unique identifier. In one embodiment, the PUF value comprises a random or pseudo-random number. As one example, block 204 can comprise reading the PUF value from an uninitialized portion of a volatile storage area. For example, one kilobyte of uninitialized SRAM can be read in block 204 and used as the PUF value. In such an example, the uninitialized portion is reserved by the system implementing method 200 and is inaccessible to any external devices. In an embodiment, the value of the uninitialized portion comprises a random but repeatable sequence of binary digits.

In one embodiment, the PUF value comprises an intrinsic identifier created by an SRAM PUF, based on the behavior of standard SRAM memory that is available in any digital chip. In an embodiment, each SRAM cell can have its own preferred state every time the SRAM is powered, resulting from random differences in the threshold voltages. In an embodiment, this randomness can be expressed in the startup values of "uninitialized" SRAM memory. Hence, an SRAM response can yield a unique and random pattern of 0's and 1's. In an embodiment, this value is unique to a particular SRAM and hence a particular chip implementing the SRAM.

In block 206, method 200 can comprise generating a seed value.

In one embodiment, a seed value can comprise a derived value. In one embodiment, the derived value is deterministic, given the input of a PUF value. In one embodiment, method 200 can use a bit shifting algorithm to generate the seed value. In another embodiment, method 200 can use a hash algorithm to generate the seed value. In such an embodiment, method 200 can use an SHA-256 or similar irreversible hash algorithm.

In block 208, method 200 can comprise storing the seed value in a volatile storage area.

As illustrated, method 200 can write the seed value to a designated location in a volatile storage area. Thus, if method 200 is powered down (e.g., an HSM loses power), the seed value is intrinsically erased from the volatile storage area. In one embodiment, method 200 can write the seed value to a well-defined (e.g., fixed) location in the volatile storage area. In another embodiment, method 200 can write the seed value to a dedicated register. In some embodiments, this dedicated register can then be latched to the crypto-processor executing method 200. Thus, in later methods (described herein), access to the seed value can be latched to the circuitry of the crypto-processor and thus not require memory access.

In some embodiments, a non-transitory computer-readable storage medium for tangibly storing computer program instructions capable of being executed by a computer processor can be used to implement method 200. In some embodiments, a processor (e.g., crypto-processor 106) can execute the computer program instructions.

Figure 3:
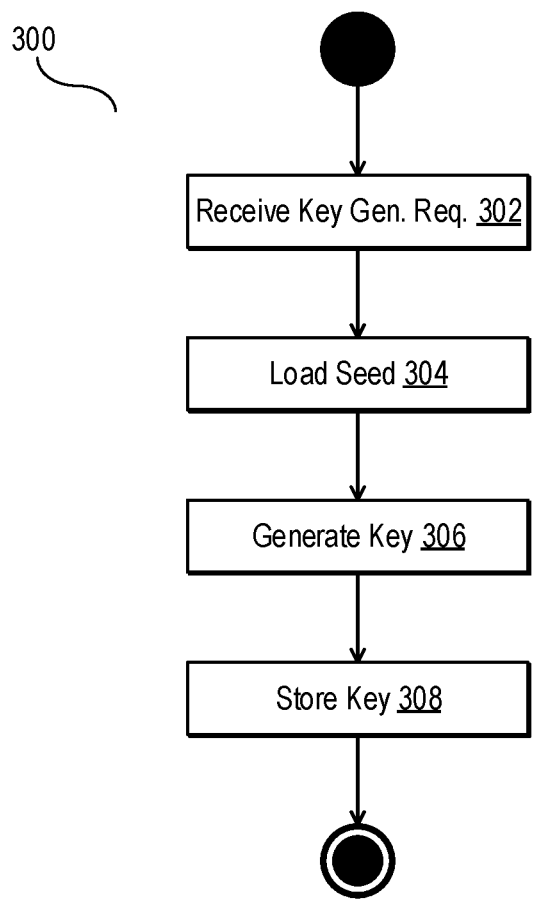
FIG. 3 is a flow diagram illustrating a method for generating a cryptographic key in an HSM according to some embodiments.

FIG. 3 is a flow diagram illustrating a method for generating a cryptographic key in an HSM according to some embodiments. In an embodiment, a crypto-processor of an HSM can execute method 300. In an embodiment, a processor of a memory device can execute method 300. However, the disclosure does not limit the type of process that can execute method 300.

In block 302, method 300 can comprise receiving a key generation request. In one embodiment, method 300 exposes an application programming interface (API) that allows external devices to request new cryptographic keys. In one embodiment, as will be discussed, method 300 can retain all cryptographic keys or may provide some or all to the requesting user. In general, however, a command to generate a new key will take no parameters and only return a success or error message.

In block 304, method 300 can comprise loading a seed value.

In an embodiment, method 300 accesses the seed value from the volatile storage area in response to the command to generate a new key. In an embodiment, method 300 can load the seed value from a well-defined location in the volatile storage area. In another embodiment, method 300 can load the seed value from a designated register. In another embodiment, if the seed value register is latched to the crypto-processor, method 300 can immediately access the seed value.

In block 306, method 300 can comprise generating a cryptographic key.

In an embodiment, method 300 uses the seed value in lieu of an RNG or PRNG output. The disclosure does not place a limit on the type of key generation algorithm used. In one embodiment, method 300 can generate a symmetric key. In other embodiments, method 300 can generate an asymmetric key (i.e., a public-private key pair). If generating a public-private key pair, method 300 can return the public key portion to the calling device in response to the key generation command or in response to a retrieval command. Examples of symmetric algorithms include, but are not limited to, Advanced Encryption Standard (AES), Salsa20/ChaCha20, CAST, Twofish, IDEA, Serpent, RC5, RC6, Camellia, and ARIA algorithms. Examples of asymmetric algorithms include, but are not limited to, RSA, ECC, ElGamal, DHKE, ECDH, DSA, ECDSA, EdDSA algorithms.

Although only one cryptographic key is discussed, in some embodiments, method 300 can be executed multiple times to generate multiple cryptographic keys. In some embodiments, method 300 can generate both asymmetric and symmetric cryptographic keys. In such an embodiment, the command to generate the cryptographic key can include a type of key to create and any necessary parameters.

In block 308, method 300 can comprise storing the cryptographic key in a volatile storage area.

As illustrated, method 300 can write the cryptographic key to a designated location in a volatile storage area. Thus, if method 300 is powered down (e.g., an HSM loses power), all cryptographic keys are intrinsically erased from the volatile storage area. In one embodiment, method 300 can write the cryptographic key to a well-defined (e.g., fixed) region in the volatile storage area. In another embodiment, method 300 can write the cryptographic key to a dedicated register or register file. In some embodiments, this dedicated register or register file can then be latched to the crypto-processor executing method 300. Thus, in later methods (described herein), access to the cryptographic keys can be latched to the circuitry of the crypto-processor and thus not require memory access.

In some embodiments, a non-transitory computer-readable storage medium for tangibly storing computer program instructions capable of being executed by a computer processor can be used to implement method 300. In some embodiments, a processor (e.g., crypto-processor 106) can execute the computer program instructions.

Figure 4:
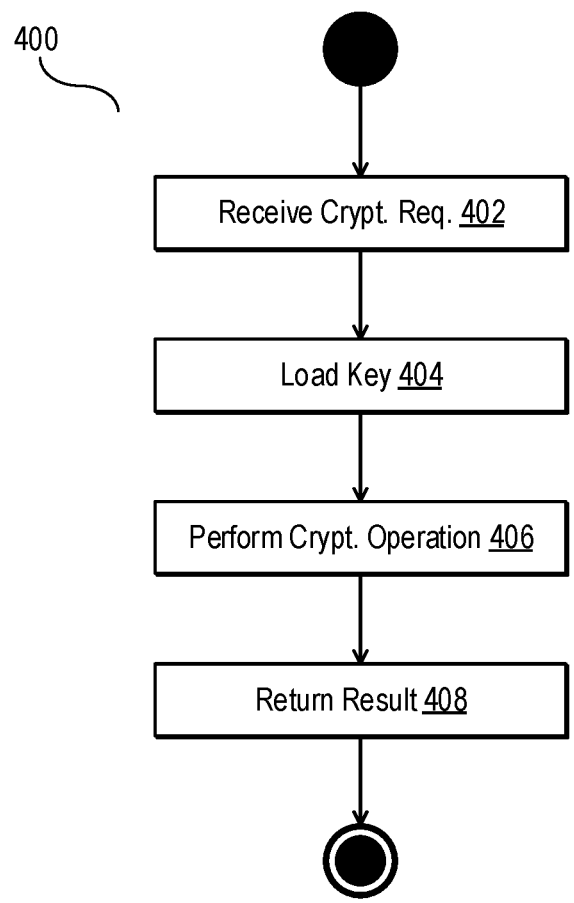
FIG. 4 is a flow diagram illustrating a method for processing a secure operation by an HSM according to some embodiments.

FIG. 4 is a flow diagram illustrating a method for processing a secure operation by an HSM according to some embodiments. In an embodiment, a crypto-processor of an HSM can execute method 400. In an embodiment, a processor of a memory device can execute method 400. However, the disclosure does not limit the type of process that can execute method 400.

In block 402, method 400 can comprise receiving a request to perform a cryptographic operation.

The disclosure places no limit on the types of cryptographic operations. In general, a cryptographic operation can comprise any operation that requires a cryptographic key. Examples of cryptographic operations include encryption, decryption, signature generation, and similar operations. The cryptographic operations can also include administrative operations such as public key retrieval, cryptographic key erasure, etc.

In block 404, method 400 can comprise loading a cryptographic key. In an embodiment, the cryptographic key corresponds to the key generated in block 306 and that disclosure is not repeated herein for the sake of clarity. In an embodiment, method 400 can load the cryptographic key from a designated location in a volatile storage area. In an embodiment, the designated location can comprise a well-defined (e.g., fixed) region in the volatile storage area. In another embodiment, method 400 can load the cryptographic key from a dedicated register or register file. In some embodiments, this dedicated register or register file can then be latched to the crypto-processor executing method 400. Thus, in an embodiment, access to the cryptographic keys can be latched to the circuitry of the crypto-processor and thus not require memory access. As such, in some embodiments, method 400 may not load cryptographic keys but rather latch the key to an input of a crypto-processor for use in one or more cryptographic operations.

In block 406, method 400 can comprise performing a cryptographic operation using the cryptographic key. The disclosure places no limit on the types of cryptographic operations performed. In general, method 400 can perform any cryptographic operation that requires a cryptographic key. For example, method 400 can perform encryption or decryption operations using the cryptographic key. Alternatively, or in conjunction with the foregoing, method 400 can generate a digital signature using the cryptographic key and a data input. Other types of cryptographic key-based operations can be implemented.

In block 408, method 400 can comprise returning a result of the cryptographic operation. In an embodiment, method 400 returns the results of the cryptographic operation over a designated interface. In some embodiments, this interface can comprise a standardized HSM interface and thus method 400 can be implemented seamlessly in lieu of existing HSM devices.

In some embodiments, a non-transitory computer-readable storage medium for tangibly storing computer program instructions capable of being executed by a computer processor can be used to implement method 400. In some embodiments, a processor (e.g., crypto-processor 106) can execute the computer program instructions.

Figure 5:
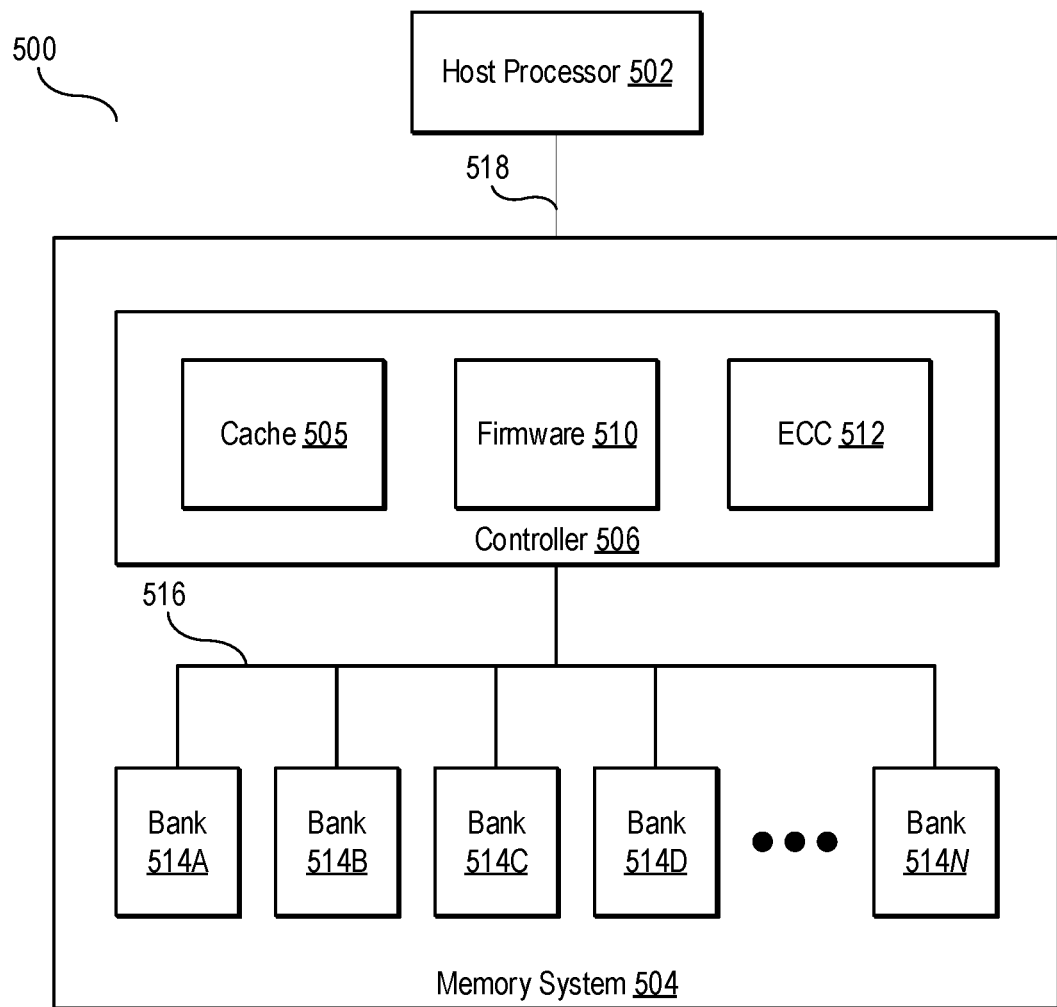
FIG. 5 is a block diagram illustrating a memory system according to some embodiments.

FIG. 5 is a block diagram illustrating a memory system according to some embodiments. Various features of FIG. 5 have been described logically in the description of FIG. 1, and those features are incorporated herein by reference in their entirety.

As illustrated in FIG. 5, a computing system 500 includes a host processor 502 communicatively coupled to a memory system 504 via a bus 518. The memory system 504 comprises a controller 506 communicatively coupled to one or more memory banks 514A-514N, forming a memory array via a bus/interface 516. As illustrated, controller 506 includes a local cache 505, firmware 510, and an error correction code (ECC) module 512.

In the illustrated embodiment, a host processor 502 can comprise any type of computer processor, e.g., a central processing unit (CPU), graphics processing unit (GPU), or other types of general-purpose or special-purpose computing devices. The host processor 502 includes one or more output ports that allow for the transmission of address, user, and control data between the host processor 502 and the memory system 504. In the illustrated embodiment, this communication is performed over bus 518. In one embodiment, bus 518 comprises an input/output (I/O) bus or a similar type of bus.

The memory system 504 is responsible for managing one or more memory banks 514A-514N. In one embodiment, the banks 514A-514N comprise NAND Flash dies or other configurations of non-volatile memory. In one embodiment, the memory banks 514A-514N comprise a memory array.

The banks 514A-514N are managed by controller 506. In some embodiments, controller 506 comprises a computing device configured to mediate access to and from banks 514A-514N. In one embodiment, controller 506 comprises an ASIC or other circuitry installed on a printed circuit board housing the banks 514A-514N. In some embodiments, controller 506 may be physically separate from the banks 514A-514N. The controller 506 communicates with the banks 514A-514N over the interface 516. In some embodiments, this interface 516 comprises a physically wired (e.g., traced) interface. In other embodiments, interface 516 comprises a standard bus for communicating with banks 514A-514N.

Controller 506 comprises various modules 505-512. In one embodiment, the various modules 505-512 comprise various physically distinct modules or circuits. In other embodiments, modules 505-512 may completely (or partially) be implemented in software or firmware.

As illustrated, firmware 510 comprises the core of the controller and manages all operations of controller 506. The firmware 510 may implement some or all of the methods described above.

Figure 6:
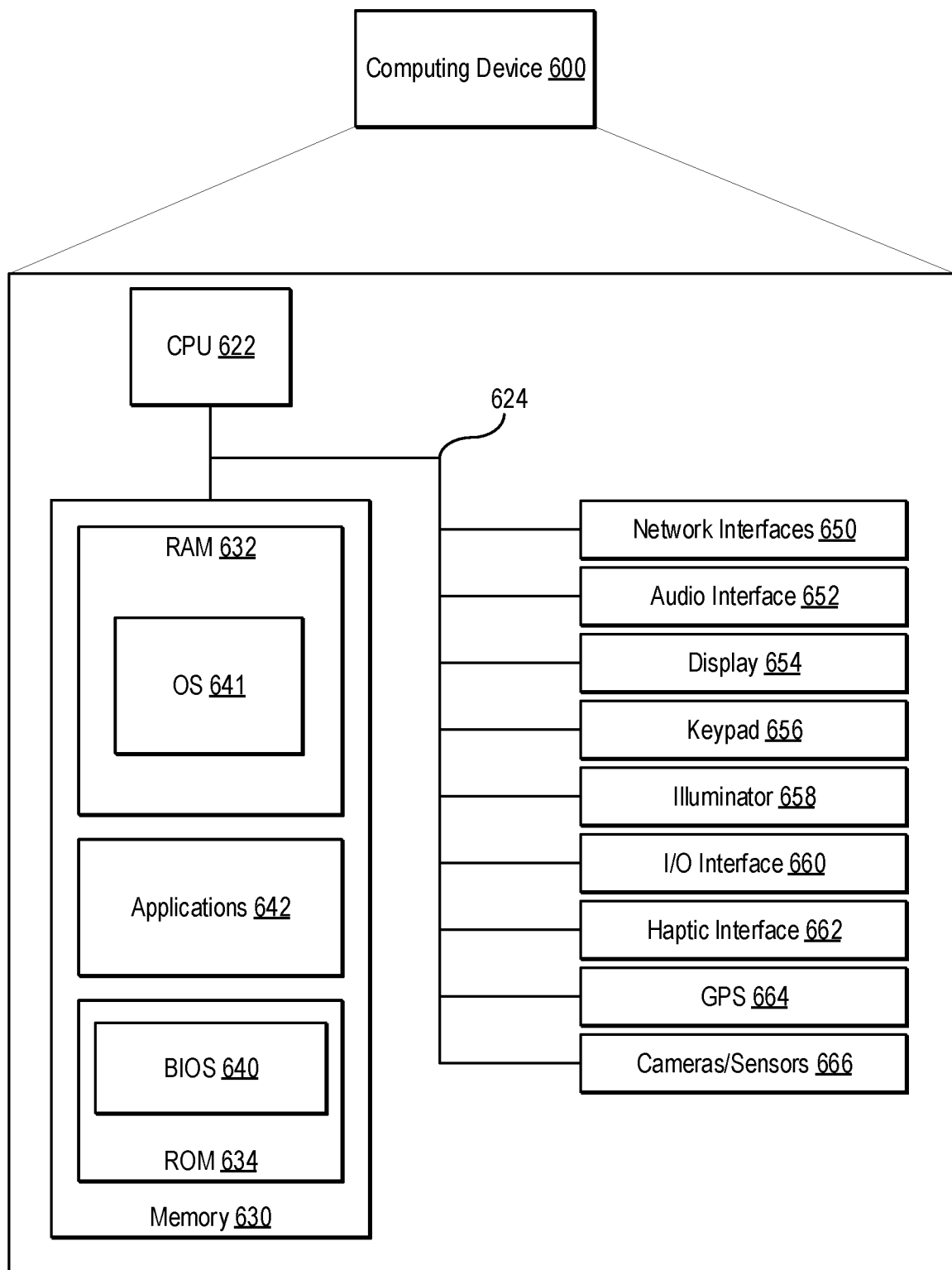
FIG. 6 is a block diagram illustrating a computing device showing an example of a client or server device used in the various embodiments of the disclosure.

FIG. 6 is a block diagram illustrating a computing device showing an example of a client or server device used in the various embodiments of the disclosure.

The device 600 can include more or fewer components than those shown in FIG. 6, depending on the deployment or usage of the device 600. For example, a server computing device, such as a rack-mounted server, may not include an audio interface 652, display 654, keypad 656, illuminator 658, haptic interface 662, Global Positioning System (GPS) receiver 664, or cameras/sensors 666. Some devices can include additional components not shown, such as graphics processing unit (GPU) devices, cryptographic co-processors, artificial intelligence (AI) accelerators, or other peripheral devices.

As shown in the figure, device 600 includes a central processing unit, CPU 622, in communication with a mass memory 630 via a bus 624. The device 600 also includes a network interface 650, an audio interface 652, a display 654, a keypad 656, an illuminator 658, an input/output interface 660, a haptic interface 662, a GPS receiver 664, and camera(s) or other optical, thermal, or electromagnetic sensors such as cameras/sensors 666. Device 600 can include one camera/sensor or a plurality of cameras/sensors 666. The positioning of the cameras/sensors 666 on the device 600 can change per device 600 model, per device 600 capabilities, and the like, or some combination thereof.

In some embodiments, the CPU 622 can comprise a general-purpose CPU. The CPU 622 can comprise a single-core or multiple-core CPU. The CPU 622 can comprise a system-on-a-chip (SoC) or a similar embedded system. In some embodiments, a GPU can be used in place of, or in combination with, a CPU 622. Mass memory 630 can comprise a dynamic random-access memory (DRAM) device, a static random-access memory device (SRAM), or a Flash (e.g., NAND Flash) memory device. In some embodiments, mass memory 630 can comprise a combination of such memory types. In one embodiment, the bus 624 can comprise a Peripheral Component Interconnect Express (PCIe) bus. In some embodiments, bus 624 can comprise multiple busses instead of a single bus.

Mass memory 630 illustrates another example of computer storage media for the storage of information such as computer-readable instructions, data structures, program modules, or other data. Mass memory 630 stores a basic input/output system, BIOS 640, for controlling the low-level operation of the device 600. In the illustrated embodiment, the BIOS 640 may be stored in a read-only memory (ROM) such as ROM 634. The mass memory also stores an operating system 641 for controlling the operation of the device 600.

Applications 642 can include computer-executable instructions which, when executed by the device 600, perform any of the methods (or portions of the methods) described previously in the description of the preceding Figures. In some embodiments, the software or programs implementing the method embodiments can be read from a hard disk drive (not illustrated) and temporarily stored in RAM 632 by CPU 622. CPU 622 can then read the software or data from RAM 632, process them, and store them in RAM 632 again.

The device 600 can optionally communicate with a base station (not shown) or directly with another computing device. Network interface 650 is sometimes known as a transceiver, transceiving device, or network interface card (NIC).

The audio interface 652 produces and receives audio signals such as the sound of a human voice. For example, the audio interface 652 can be coupled to a speaker and microphone (not shown) to enable telecommunication with others or generate an audio acknowledgment for some action. Display 654 can be a liquid crystal display (LCD), gas plasma, light-emitting diode (LED), or any other type of display used with a computing device. Display 654 can also include a touch-sensitive screen arranged to receive input from an object such as a stylus or a digit from a human hand.

Keypad 656 can comprise any input device arranged to receive input from a user. Illuminator 658 can provide a status indication or provide light.

The device 600 also comprises an input/output interface 660 for communicating with external devices, using communication technologies, such as USB, infrared, Bluetooth®, or the like. The haptic interface 662 provides tactile feedback to a user of the client device.

The GPS receiver 664 can determine the physical coordinates of the device 600 on the surface of the Earth, which typically outputs a location as latitude and longitude values. GPS receiver 664 can also employ other geo-positioning mechanisms, including, but not limited to, triangulation, assisted GPS (AGPS), E-OTD, CI, SAI, ETA, BSS, or the like, to further determine the physical location of the device 600 on the surface of the Earth. In one embodiment, however, the device 600 can communicate through other components, provide other information that can be employed to determine the physical location of the device, including, for example, a MAC address, IP address, or the like.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to the desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any programming language. It will be appreciated that a variety of programming languages can be used to implement the teachings of the disclosure as described herein.

The present disclosure can be provided as a computer program product or software that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as read-only memory ("ROM"), random access memory ("RAM"), magnetic disk storage media, optical storage media, flash memory components, etc.

In this description, various functions and operations are described as being performed by or caused by computer instructions to simplify the description. However, those skilled in the art will recognize what is meant by such expressions is that the functions result from the execution of the computer instructions by one or more controllers or processors, such as a microprocessor. Alternatively, or in combination, the functions and operations can be implemented using special-purpose circuitry, with or without software instructions, such as using Application-Specific Integrated Circuit (ASIC) or Field-Programmable Gate Array (FPGA). Embodiments can be implemented using hardwired circuitry without software instructions or in combination with software instructions. Thus, the techniques are limited neither to any specific combination of hardware circuitry and software nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A device comprising:
  a volatile storage area, the volatile storage area comprising a dedicated register, the dedicated register located at a fixed location within a register file;
  a physically unclonable function (PUF);
  a processor configured to:
    read a random value from the PUF,
    generate a seed value from the random value, and
    write the seed value to the dedicated register of the volatile storage area; and
  a crypto-processor physically latched to the dedicated register of the volatile storage area and configured to:
    generate a cryptographic key using the seed value stored in the volatile storage area, and
    process a cryptographic operation using the cryptographic key, wherein the dedicated register is inaccessible to devices external to the cryptoprocessor.

2. The device of claim 1, wherein the PUF comprises a static random-access memory (SRAM) PUF.

3. The device of claim 1, wherein the volatile storage area comprises an SRAM device.

4. The device of claim 1, wherein the PUF comprises a dedicated location in the volatile storage area.

5. The device of claim 1, the processor further configured to write the cryptographic key to the volatile storage area.

6. The device of claim 1, wherein the cryptographic operation is selected from a group consisting of encryption, decryption, and signature generation operations.

7. A method comprising:
  reading, by a processor, a random value from a physically unclonable function (PUF);
  generating, by the processor, a seed value from the random value;

writing, by the processor, the seed value to a volatile storage area, the volatile storage area comprising a dedicated register, the dedicated register located at a fixed location within a register file;

generating, by a cryptoprocessor physically latched to the dedicated register of the volatile storage area, a cryptographic key using the seed value stored in the dedicated register the volatile storage area; and processing, by the cryptoprocessor, a cryptographic operation using the cryptographic key, wherein the dedicated register is inaccessible to devices external to the cryptoprocessor.

8. The method of claim 7, wherein reading a random value from the PUF comprises reading the random value from a static random-access memory (SRAM) PUF.

9. The method of claim 7, wherein reading a random value from the PUF comprises reading the random value from a dedicated location in a volatile storage area.

10. The method of claim 7 further comprising writing the seed value to a volatile storage area.

11. The method of claim 7 further comprising writing the cryptographic key to a volatile storage area.

12. The method of claim 7, wherein the cryptographic operation is selected from a group consisting of encryption, decryption, and signature generation operations.

13. A non-transitory computer-readable storage medium for tangibly storing computer program instructions capable of being executed by a computer processor, the computer program instructions defining steps of:

reading, by a processor, a random value from a physically unclonable function (PUF);

generating, by the processor, a seed value from the random value;

writing, by the processor, the seed value to a volatile storage area, the volatile storage area comprising a dedicated register, the dedicated register located at a fixed location within a register file;

generating, by a cryptoprocessor physically latched to the dedicated register of the volatile storage area, a cryptographic key using the seed value stored in the dedicated register the volatile storage area; and processing, by the cryptoprocessor, a cryptographic operation using the cryptographic key, wherein the dedicated register is inaccessible to devices external to the cryptoprocessor.

14. The non-transitory computer-readable storage medium of claim 13, wherein the PUF comprises a static random-access memory (SRAM) PUF.

15. The non-transitory computer-readable storage medium of claim 13, wherein the volatile storage area comprises an SRAM device.

16. The non-transitory computer-readable storage medium of claim 13, wherein the PUF comprises a dedicated location in a volatile storage area.

17. The non-transitory computer-readable storage medium of claim 13, the steps further comprising writing the seed value to a volatile storage area.

18. The non-transitory computer-readable storage medium of claim 13, the steps further comprising writing the cryptographic key to a volatile storage area.

19. The non-transitory computer-readable storage medium of claim 13, wherein the cryptographic operation is selected from a group consisting of encryption, decryption, and signature generation operations.

* * * * *